(12) United States Patent
Kwon et al.

(10) Patent No.: US 10,021,294 B2
(45) Date of Patent: Jul. 10, 2018

(54) MOBILE TERMINAL FOR PROVIDING PARTIAL ATTRIBUTE CHANGES OF CAMERA PREVIEW IMAGE AND METHOD FOR CONTROLLING THE SAME

(71) Applicant: LG ELECTRONICS INC., Seoul (KR)

(72) Inventors: Yunmi Kwon, Seoul (KR); Kyunghee Kang, Seoul (KR); Kiseon Lee, Seoul (KR)

(73) Assignee: LG ELECTRONICS, Seoul (KR)

( * ) Notice: Subject to any disclaimer, the term of this patent is extended or adjusted under 35 U.S.C. 154(b) by 0 days.

(21) Appl. No.: 15/258,853

(22) Filed: Sep. 7, 2016

(65) Prior Publication Data

US 2017/0070670 A1    Mar. 9, 2017

(30) Foreign Application Priority Data

Sep. 8, 2015  (KR) ........................ 10-2015-0127232

(51) Int. Cl.
*H04N 5/222* (2006.01)
*H04N 5/232* (2006.01)
*G06F 3/0484* (2013.01)
*G06T 7/246* (2017.01)
*H04N 5/262* (2006.01)
(Continued)

(52) U.S. Cl.
CPC ..... *H04N 5/23222* (2013.01); *G06F 3/04845* (2013.01); *G06T 7/246* (2017.01); *H04N 5/23216* (2013.01); *H04N 5/23293* (2013.01); *G06F 3/0488* (2013.01); *H04N 1/00411* (2013.01)

(58) Field of Classification Search
CPC .......... H04N 5/23293; H04N 5/23222; H04N 5/23216; H04N 1/00411; G06F 3/04883; G06F 3/04845
USPC ............. 348/222.1, 333.01–333.03, 333.05, 348/333.11–333.12
See application file for complete search history.

(56) References Cited

U.S. PATENT DOCUMENTS 6,344,907 B1   2/2002  Watanabe et al.
7,667,759 B2 *  2/2010  Suzuki ............... H04N 5/23293
                                                    348/333.05
(Continued)

FOREIGN PATENT DOCUMENTS

WO      2015123792 A1    8/2015

*Primary Examiner* — Ngoc-Yen Vu
(74) *Attorney, Agent, or Firm* — Dentons US LLP

(57) ABSTRACT

A mobile terminal and a method for controlling the mobile terminal are disclosed. A mobile terminal according to the present invention comprises a camera; touch screen; and a controller displaying a first preview image obtained from the camera on the touch screen, if receiving a touch input selecting one area of the first preview image, displaying at least one recommended image with respect to the selected area having image attributes different from those of the selected area on one area of the touch screen, and if receiving an input selecting one of the displayed recommended images, displaying on the touch screen a second preview image reflecting the selected recommended image on the selected area. According to the present invention, since a recommended image is provided for a selected area from among preview images displayed on a touch screen, image attributes of the selected area can be changed easily.

19 Claims, 32 Drawing Sheets

(51) Int. Cl.
    *H04N 1/00*         (2006.01)
    *G06F 3/0488*     (2013.01)

(56)                  References Cited

U.S. PATENT DOCUMENTS

| | | | |
|---|---|---|---|
| 8,659,667 B2* | 2/2014 | Syed | H04N 1/00137 348/207.1 |
| 8,725,712 B2* | 5/2014 | Arrasvuori | G06F 17/30265 707/706 |
| 8,963,988 B2* | 2/2015 | Vaisburd | H04N 7/147 348/14.08 |
| 8,988,342 B2* | 3/2015 | Choi | G06F 3/017 345/156 |
| 9,148,618 B2* | 9/2015 | Matas | H04N 5/772 |
| 9,250,778 B2* | 2/2016 | Yang | G06F 3/0482 |
| 9,502,034 B2* | 11/2016 | Kim | G06F 3/167 |
| 9,635,249 B2* | 4/2017 | Kimura | H04N 5/23222 |
| 9,699,389 B2* | 7/2017 | Sakai | H04N 5/2621 |
| 2008/0152228 A1 | 6/2008 | Tokuse | |
| 2009/0319897 A1 | 12/2009 | Kotler et al. | |
| 2011/0261225 A1 | 10/2011 | Niinami | |
| 2012/0120277 A1* | 5/2012 | Tsai | H04N 5/23212 348/223.1 |
| 2012/0176401 A1 | 7/2012 | Hayward et al. | |
| 2012/0294549 A1 | 11/2012 | Doepke | |
| 2014/0040796 A1 | 2/2014 | Tighe et al. | |
| 2014/0056540 A1 | 2/2014 | Hamburg et al. | |
| 2015/0130831 A1 | 5/2015 | Kokemohr | |
| 2015/0213609 A1 | 7/2015 | Lin et al. | |
| 2015/0341564 A1* | 11/2015 | Chang | H04N 5/23293 348/222.1 |
| 2016/0323557 A1* | 11/2016 | Drazic | H04N 5/23212 |

\* cited by examiner

MOBILE TERMINAL FOR PROVIDING
PARTIAL ATTRIBUTE CHANGES OF
CAMERA PREVIEW IMAGE AND METHOD
FOR CONTROLLING THE SAME

CROSS-REFERENCE TO RELATED
APPLICATIONS

This application claims priority to Korean Patent Application No. 10-2015-0127232 filed on 8 Sep. 2015 in Korea, the entire contents of which is hereby incorporated by reference in its entirety.

BACKGROUND OF THE INVENTION

Field of the Invention

The present invention is related to a mobile terminal with enhanced user convenience to enable the user to obtain a desired image through a camera and a method for controlling the mobile terminal.

Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, as mobile terminals equipped with a camera are widely used, the user can perform image capture by using a camera installed in a mobile terminal anytime and anywhere. Accordingly, the user may have to adjust camera settings properly according to the surroundings when he or she wants to take an image from the camera; however, there may be cases in which the user finds it difficult to operate the camera. Therefore, a mobile device with which the user can easily capture an image without being involved in a complicated operation of a camera is needed.

SUMMARY OF THE INVENTION

Accordingly, an object of the present invention is to address the above-noted and other problems.

The present invention aims to solve the technical problem described above and other associated problems. Another object of the present invention is to provide a mobile terminal providing a recommended image for a user with respect to a selected area among preview images displayed on a touch screen and allowing the user to change image attributes of the selected area easily; and a method for controlling the mobile terminal.

A mobile terminal according to one aspect of the present invention to achieve the object above or another object comprises a camera; touch screen; and a controller displaying a first preview image obtained from the camera on the touch screen, if receiving a touch input selecting one area of the first preview image, displaying at least one recommended image with respect to the selected area having image attributes different from those of the selected area on one area of the touch screen, and if receiving an input selecting one of the displayed recommended images, displaying on the touch screen a second preview image reflecting the selected recommended image on the selected area.

The touch input can be a dragging input in one predetermined direction, and the controller can select an area around an object displayed on one area of the touch screen to which the dragging input has been applied and display the boundary of the selected area.

In case the first preview image is changed according to a movement of the mobile terminal, the controller can maintain the selected area.

In case the object moves, the controller can maintain the selected area around the object by detecting movement of the object.

The image attributes can include brightness, saturation, color, hue, contrast or sharpness.

The mobile terminal can further comprise memory storing the respective reference ranges predetermined for a plurality of image attributes, and the controller can extract the value of each image attribute from the selected area and display an image compensating the selected area with respect to an image attribute of which the extracted value exceeds the reference range as the recommended image.

The memory can store a plurality of images captured through the camera, and the controller can determine the reference range on the basis of the value of each image attribute extracted from the plurality of images.

The mobile terminal can further comprise a wireless communication unit, and the controller can receive a plurality of images through the wireless communication unit and determine the reference range on the basis of the value of each image attribute extracted from the plurality of images.

In case the displayed recommended image comprises a plurality of images, individual recommended images can have different values with respect to at least one image attribute.

In case a plurality of areas are selected from the first preview image, the controller can extract the image attribute value of the selected recommended image and apply the extracted image attribute value to the plurality of areas.

In case a different area is selected before a predetermined time period is passed after the selected recommended image is reflected in the selected area, the controller can extract the image attribute value of the selected recommended image and apply the extracted image attribute value to the different area.

Receiving a touch input selecting a plurality of recommended images from among the displayed recommended images, the controller can extract image attribute values of the plurality of recommended images selected and apply the extracted image attribute values to the selected area respectively.

The controller can change image attributes of the selected recommended image according to a dragging input on an area displaying the selected recommended image.

The controller separates the selected area into an object and a background and reflect the selected recommended image for the object.

The controller can change image attribute values of the background gradually from the central area of the selected area to the boundary thereof so that the background of the selected area may not be distinguished from other areas of the second preview image.

The controller can apply image attribute values of the background to the background of the second preview image so that the background of the selected area may not be distinguished from other areas of the second preview image.

In case a predetermined touch input is received, the controller can restore the displayed second preview image to the first preview image.

Also, a method for controlling a mobile terminal according to another aspect of the present invention comprises displaying a first preview image obtained from a camera on a touch screen; receiving a touch input selecting one area of the first preview image; displaying at least one recommended image with respect to the selected area having an image attribute different from that of the selected area; receiving an input selecting one of the displayed recommended images; and displaying on the touch screen a second preview image reflecting the selected recommended image into the selected area.

Advantageous effects from a mobile terminal according to the present invention and a method for controlling the mobile terminal can be described as follows.

According to at least one of embodiments of the present invention, since a recommended image is provided for a selected area from among preview images displayed on a touch screen, and the selected recommended image is reflected into the selected area, image attributes of the selected area can be changed easily.

Also, according to at least one of embodiments of the present invention, if a recommended image is selected, since the selected recommended image is displayed in a selected area by reflecting image attributes of the selected recommended image into the selected area in real-time, the state of the selected area according to the changed image attributes can be checked before the changed image attributes are applied.

Also, according to at least one of embodiments of the present invention, since an area of which the image attributes are desired to be changed can be selected according to a simple touch input, image attributes of a target area can be changed easily.

Also, according to at least one of embodiments of the present invention, since a selected area is maintained continuously even when the selected area moves in the touch screen, image attributes of the selected area can be changed easily even when a mobile terminal or an object moves.

Also, according to at least one of embodiments of the present invention, since a recommended image is provided with respect to an image attribute exceeding a reference range from among image attributes of a selected area, the selected area can be changed to have a more relevant image attribute.

Also, according to at least one of embodiments of the present invention, since a reference range of each image attribute is calculated from a pre-captured image, a recommended image according to image attributes that the user commonly employs for image capture can be provided.

Also, according to at least one of embodiments of the present invention, since a reference range of each image attribute is calculated from a plurality of images received from the outside, an image can be captured in a format wanted by the user.

Also, according to at least one of embodiments of the present invention, since a plurality of recommended images with various image attributes are provided, the user can check various display forms with respect to a selected area.

Also, according to at least one of embodiments of the present invention, a plurality of areas can be selected, and image attributes of each area can be changed according to a simple touch input.

Also, according to at least one of embodiments of the present invention, since a plurality of recommended images are selected and image attributes of the respective recommended images are applied, a selected area can be expressed by more various image attributes.

Also, according to at least one of embodiments of the present invention, since an image attribute to be applied can be changed according to a simple touch input in a recommended image, image attributes to be applied to a selected area can be changed easily.

Also, according to at least one of embodiments of the present invention, since a changed image attribute can be applied appropriately to the background included in a selected area, the background of the selected area can be prevented from causing a sense of difference according to the change of the image attribute.

Also, according to at least one of embodiments of the present invention, since a selected area of which the image attribute has been changed can be recovered to its original state according to a simple touch input, change of image attributes can be attempted freely.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
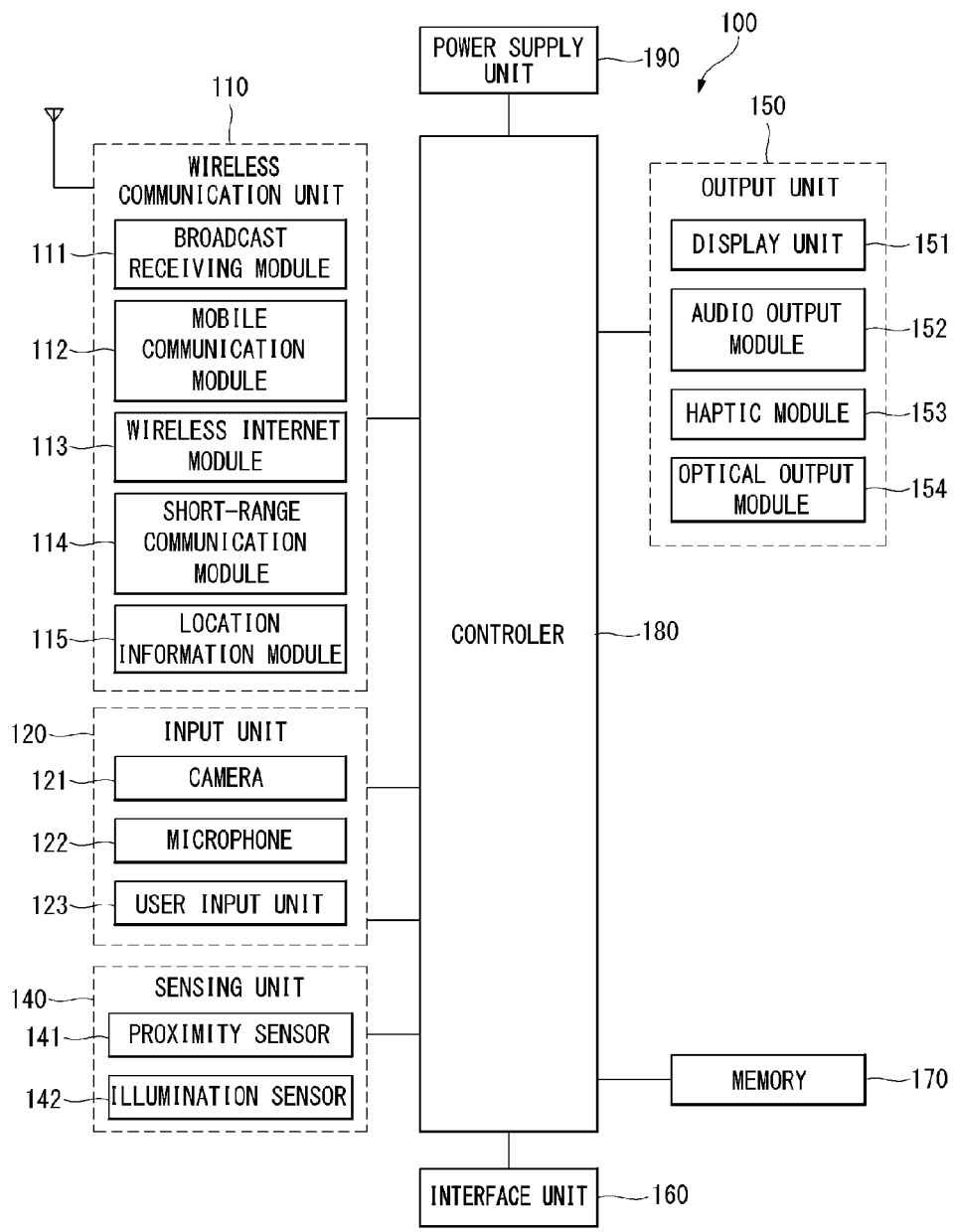
FIG. 1 is a block diagram of a mobile terminal in accordance with the present disclosure.

Reference is now made to FIG. 1, where FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Further preferred embodiments will be described in more detail with reference to additional drawing figures. It is understood by those skilled in the art that the present features can be embodied in several forms without departing from the characteristics thereof.

In what follows, embodiments related to a control method which can be implemented in a mobile terminal composed as described above will be described with reference to appended drawings. It should be clearly understood by those skilled in the art that the present invention can be embodied in other specific forms as long as they do not depart from the technical principles and essential features of the present invention.

Figure 2:
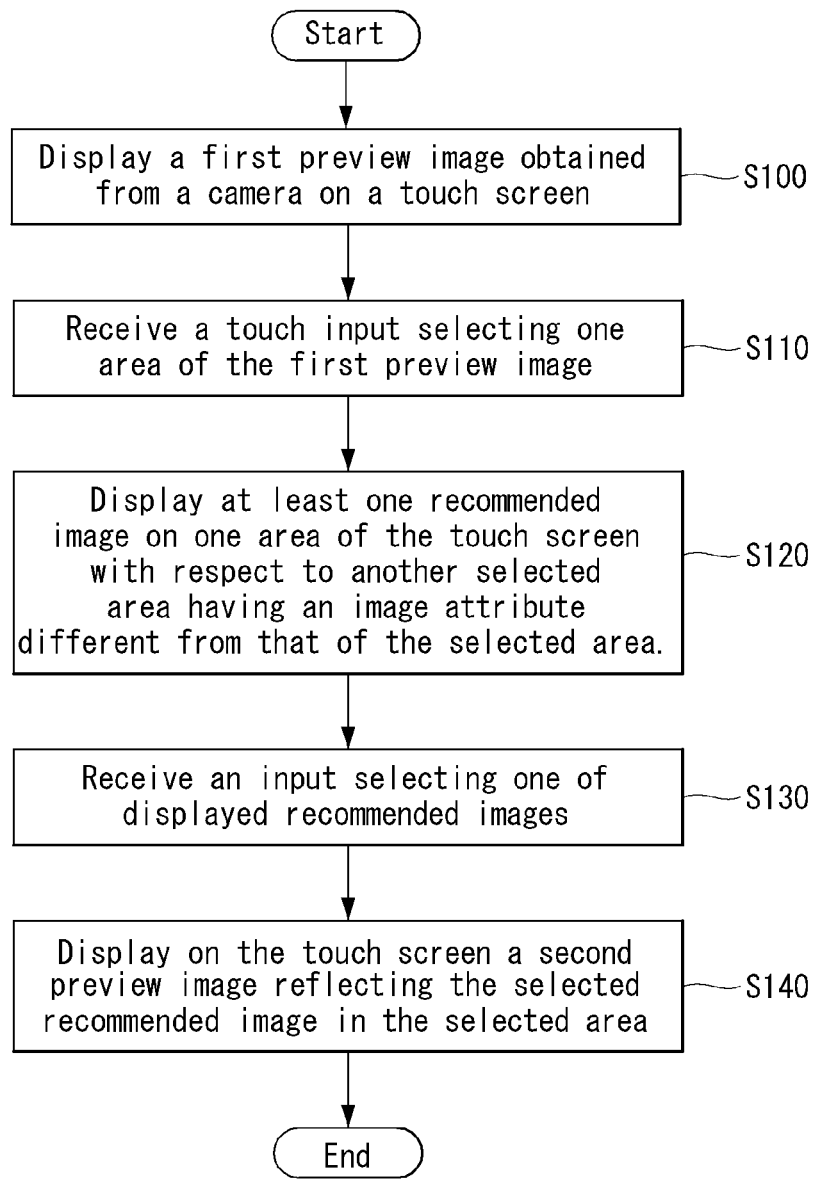
FIG. 2 is a flow diagram of a method for controlling a mobile terminal according to one embodiment of the present invention.

FIG. 2 is a flow diagram of a method for controlling a mobile terminal according to one embodiment of the present invention. FIGS. 3 to 7 illustrate changing image attributes of one area of a preview image on the basis of a recommended image according to one embodiment of the present invention.

A method for controlling a mobile terminal according to one embodiment of the present can be implemented in the mobile terminal 100 described with reference to FIG. 1. In what follows, described in detail with reference to related drawings will be a method for controlling a mobile terminal according to one embodiment of the present invention and operation of the mobile terminal 100 to implement the method.

With reference to FIG. 2, the controller 180 can display a first preview image 10 obtained from the camera 121 on the touch screen 151, S100.

Figure 3:
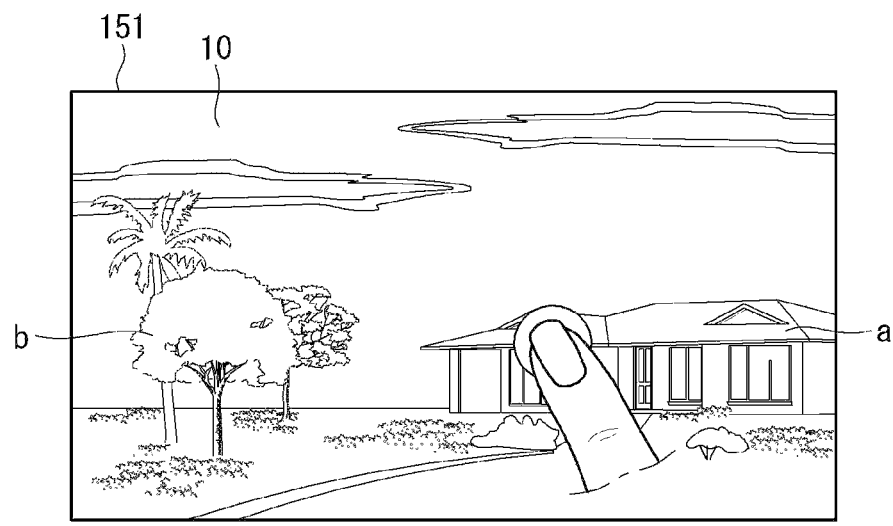
FIGS. 3 to 7 illustrate changing image attributes of one area of a preview image on the basis of a recommended image according to one embodiment of the present invention.

In case the mobile terminal 100 operates in a capture mode to capture an image, the controller 180 can drive the camera 121. In the capture mode, the controller 180 can control the camera 121 so that an image obtained from the image sensor of the camera 121 is displayed on the touch screen 151 in frame units. As shown in FIG. 3, the first preview image 10 can be an image displayed on the touch screen 151 before being stored in the memory 170.

With reference to FIG. 3, a first preview image 10 includes two objects a, b. The user can check the first preview image 10 displayed on the touch screen 151 and capture the first preview image 10 by applying a predetermined touch input or selecting a capture soft button. However, depending on the surroundings, one area of the first preview image 10 may not be displayed properly, and thus the user may want to change the first preview image 10.

Referring again to FIG. 2, the controller 180 can receive a touch input selecting one area of the first preview image 10, S110.

Figure 4:
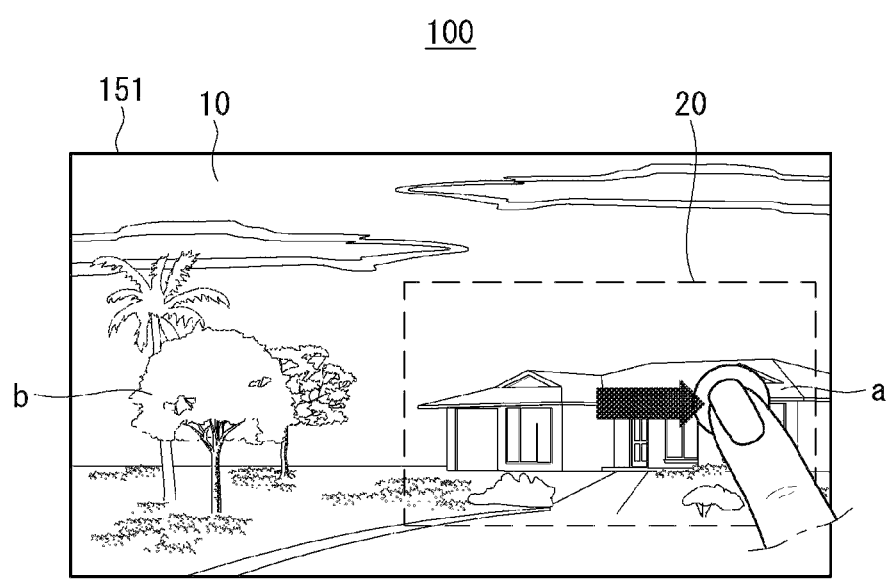

The user can select one area of the displayed first preview image 10 that the user wants to change. According to one embodiment, an input selecting the area can be a touch input dragging the area that the user wants to select in a predetermined direction. With reference to FIGS. 3 and 4, to select an area containing an object a included in the first preview image 10, the user can touch the object a and drag it to the right.

However, the dragging input to the right is only an example, and the present invention is not limited to the aforementioned example. The input selecting the one area input can be implemented by various touch methods such as a short touch, long touch, multi-touch, drag touch, flick touch, pinch-in touch, pinch-out touch, swipe touch, and hovering touch; and a combination thereof. However, for the convenience of description, in what follows, the input selecting the one area is assumed to be a dragging input to the right.

Receiving the dragging input to the right, the controller 180 can select one area 20 around the area to which the dragging input has been applied. According to one embodiment, in case an object a belongs to the area to which the dragging input has been applied, the area 20 can be selected so that it can include the object a. As shown in FIG. 4, to distinguish the selected area 20, the controller 180 can display the boundary of the selected area 20 differently from the remaining area.

The selected area 20 shown in FIG. 4 is only an example, and the present invention is not limited to the example. According to another example, the selected area 20 can be determined along the edge of the object a belonging to the area to which the dragging input has been applied. To this end, the controller 180 can extract the object a from the first preview image 10. Since extraction of an object in an image can be performed by using a method well-known to the related field, detailed descriptions thereof will be omitted.

Also, though the selected area 20 is denoted by a rectangle in FIG. 4, this is only an example, and the present invention is not limited to the example. That is, the selected area 20 can be denoted by a different form rather than the rectangle.

Referring again to FIG. 2, the controller 180 can display at least one recommended image 30, 31, 32, 33 having an image attribute different from that of the selected area on one area of the touch screen 151 with respect to the selected area.

According to one embodiment, the image attribute can include brightness, saturation, color, hue, contrast or sharpness of an image. However, the present invention is not limited to the aforementioned image attribute, and the image attribute can include various effects (for example, inversion of color, saturation, and brightness; horizontal or vertical image flipping; and adjusting transparency) due to image filters that can be applied to an image.

The controller 180 can extract the values of image attributes of the selected area 20. According to one embodiment, type of extracted image attribute can be predetermined. The controller 180 can generate at least one recommended image with respect to the selected area 20 on the basis of the extracted image attribute value.

The generated recommended images can be generated so that they can have image attributes different from those of the selected area 20. Also, each of the generated recommended images can be made to have image attributes different from each other. Generation of a recommended image related to image attributes will be dealt with again in the description of FIG. 12 later.

Figure 5:
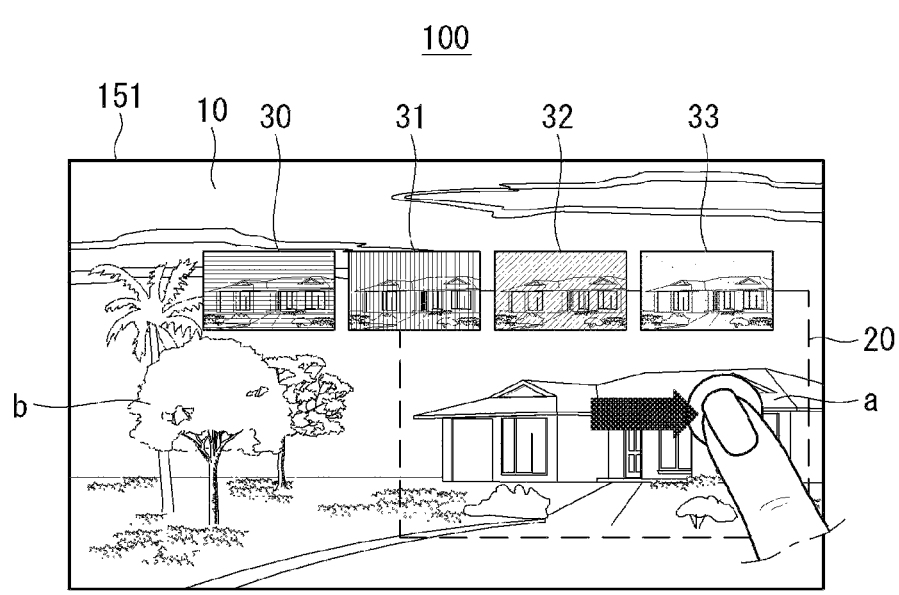

With reference to FIG. 5, the controller 180 can display at least one generated recommended image 30, 31, 32, 33 on one area of the touch screen 151. Though FIG. 5 shows four recommended images 30, 31, 32, 33, this is only one example, and the present invention is not limited to the example. Depending on situations, a different number of recommended images can be displayed for the selected area 20.

According to one embodiment, there are cases when no more recommended image is available, which shows more relevant image attributes than those currently displayed. In this case, the controller 180 can display on the touch screen 151 notification which notifies that the image attributes of the currently selected area 20 are most relevant.

With reference to FIG. 5, the recommended images 30, 31, 32, 33 are overlaid with different patterns from each other. For the convenience of drawing figures and providing descriptions, the patterns displayed on the recommended images 30, 31, 32, 33 indicate that separate image attributes are applied to the respective recommended images 30, 31, 32, 33. In other words, in case a specific pattern is added to a recommended image or a selected area, it can indicate that an image attribute different from that of the first preview image 10 has been applied.

Though the recommended images 30, 31, 32, 33 shown in FIG. 5 are displayed in the upper area of the touch screen 151, the present invention is not limited to this specific example. Depending on situations, the recommended images 30, 31, 32, 33 can be displayed in a different area of the touch screen 151. According to one embodiment, the recommended images 30, 31, 32, 33 can be displayed in a different area rather than the selected area 20 so that the selected area 20 may not occlude a displayed area.

Referring again to FIG. 2, the controller 180 can display on the touch screen a second preview image 10' which reflects a recommended image selected from among the at least one recommended images 30, 31, 32, 33 into the selected area 20 S130.

Figure 6:
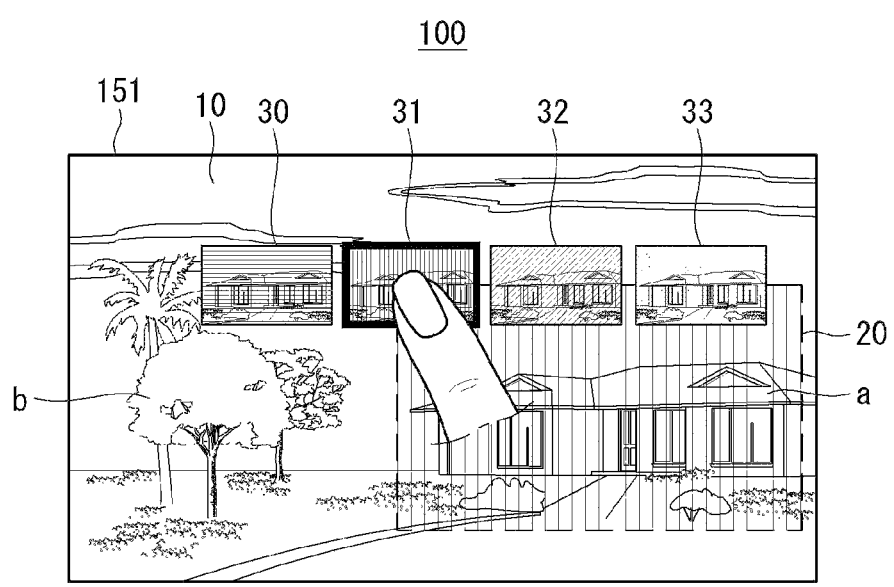

With reference to FIG. 6, the user can select a recommended image 31 which has an image attribute that the user wants to apply among the recommended images 30, 31, 32, 33 displayed on the touch screen 151. According to one embodiment, the controller 180 can display the selected recommended image 31 to be distinguished from the other recommended images 30, 32, 33. In FIG. 6, the boundary of the selected recommended image 31 is shown by a thick line; however, this is only an example, and any other method can be used as long as the method is effective to distinguish the selected recommended image 31 from the other recommended images 30, 32, 33.

According to one embodiment, if the recommended image 31 is selected, the controller 180 can change the image attribute of the selected image 20 according to the image attribute value applied to the selected recommended image 31. In this case, the controller 180 can display the selected area 20 in the first preview image 10 by using the changed image attribute. Afterwards, if the user selects a different recommended image, the controller 180 can again display the selected area 20 according to the image attribute values of the different recommended image.

Figure 7:
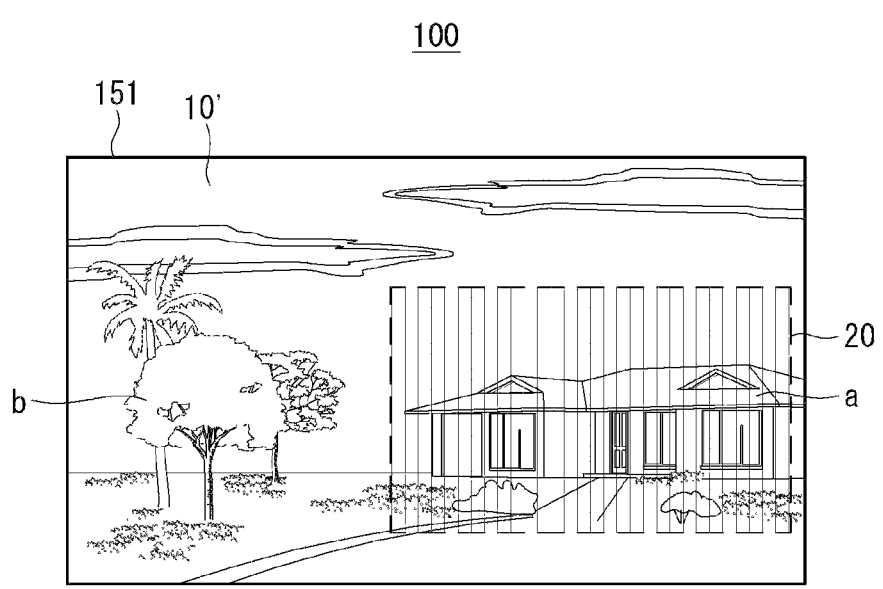

With reference to FIG. 7, if changing the image attributes of the selected area 20 is completed, the controller 180 can display on the touch screen 151 the second preview image 10' which reflects the selected recommended image 31 to the selected area 20. According to one embodiment, if a predetermined touch input is applied, the controller 180 can determine that change of the image attributes has been completed.

Referring again to FIG. 2, the controller 180 can capture the second preview image S140.

In case the user wants to capture the second preview image 10' which reflects the image attribute of the selected area 20, the user can apply a touch input or select a capture soft button (not shown) to capture an image. In this case, the controller 180 can capture the second preview image 10' and store it in the memory 170.

In the description above, it was assumed that the second preview image 10' is captured after change of an image attribute is completed, but the present invention is not limited to the assumption. According to another embodiment, if the capture soft button (not shown) is selected, the controller 180 can determine that change of the image attribute has been completed. In this case, the controller 180 can display and capture the second preview image 10'.

According to the description above, by providing a recommended image with respect to a selected image from among preview images displayed on a touch screen and reflecting a selected recommended image in the selected area, the user can easily change the image attribute of the selected area. Also, if a recommended image is selected, the image attribute of the selected recommended image is displayed by being reflected in the selected area in real-time; thus, the user can check the state of the selected area according to the changed image attribute before the changed image attribute is applied. Also, since the user can select an area of which the image attribute the user wants to change according to a simple touch input, the user can conveniently change the image attribute of the desired area.

FIGS. 8 to 11 illustrate maintaining a selected area in case a mobile terminal or an object moves according to one embodiment of the present invention.

Figure 8:
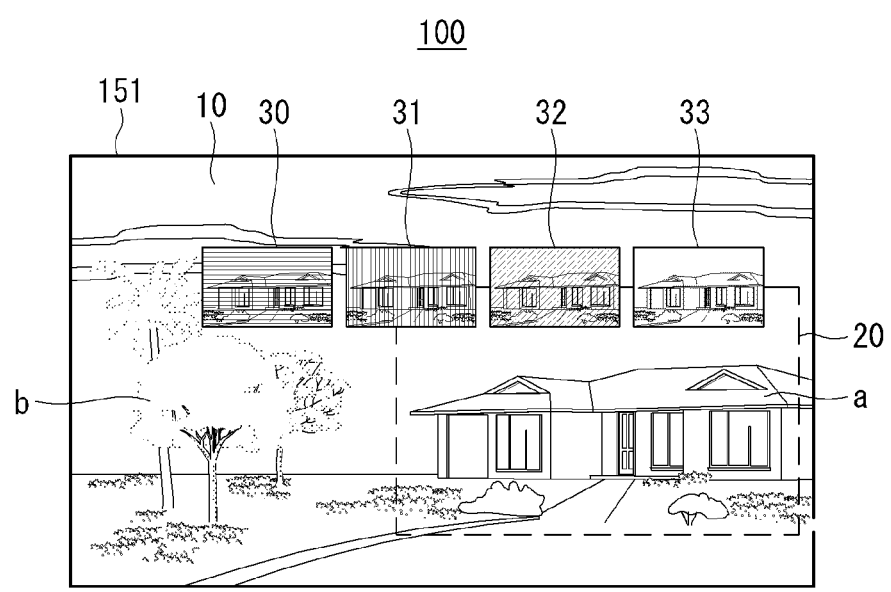
FIGS. 8 to 11 illustrate maintaining a selected area in case a mobile terminal or an object moves according to one embodiment of the present invention.

With reference to FIG. 8, a first preview image 10 is displayed on the touch screen 151. As described above, the first preview image 10 can display a selected area 20 used for changing an image attribute and recommended images 30, 31, 32, 33 with respect to the selected area 20.

Figure 9:
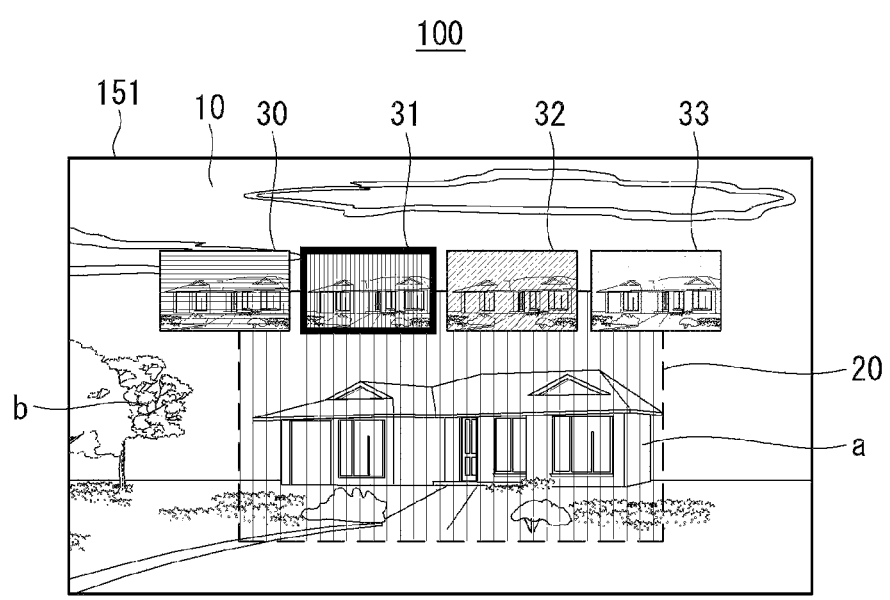

According to one embodiment, in case the first preview image 10 is changed according to the movement of the mobile terminal 100, the controller 180 can maintain the selected area 20. With reference to FIG. 9, as the user moves the mobile terminal 100 to the right, the object a within the first preview image 10 moves to the left. In this case, the controller 180 can maintain the selected area 20 as shown in FIG. 9.

To this end, the controller 180 can track the selected area 20. That is, the first preview image 10 is the image obtained from the image sensor of the camera 121, being displayed on the touch screen 151 in frame units. For example, given that images are obtained at 30 frames per second, the touch screen 151 can display 30 frames of preview images 10 for each second.

The moment one area 20 is selected from the first preview image 10, the controller 180 can continuously obtain the areas corresponding to the selected area 20 from subsequent preview images. To this end, according to one embodiment, the controller 180 can also obtain the selected area 20 from the subsequent preview images by comparing two consecutive preview images. A method for extracting a particular area by comparing two images may employ a contour comparison method, but various other methods can still be applied, not being limited to a specific method.

Accordingly, even in case the first preview image 10 is changed according as the mobile terminal 100 moves, the controller 180 still can extract the area corresponding to the selected area 20 from consecutive preview images. The controller 180 can display the extracted area as the selected area 20 in the first preview image 10 displayed on the touch screen 151.

Figure 10:
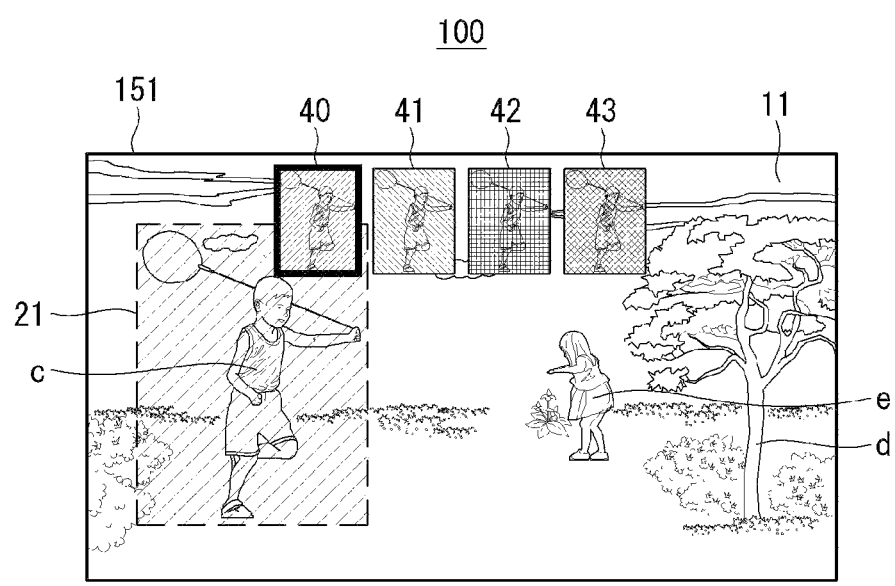

With reference to FIG. 10, a first preview image 11 is displayed on the touch screen 151. The first preview image 11 can display a selected area 21 used for changing an image attribute and recommended images 40, 41, 42, 43 with respect to the selected area 21. Three objects c, d, e are displayed in the first preview image 11, and a human is included in the selected area 21 as an object c.

According to another embodiment, in case the object c within the first preview image 11 moves, the controller 180 can detect the movement of the object c and maintain the selected area 21 around the object c.

Figure 11:
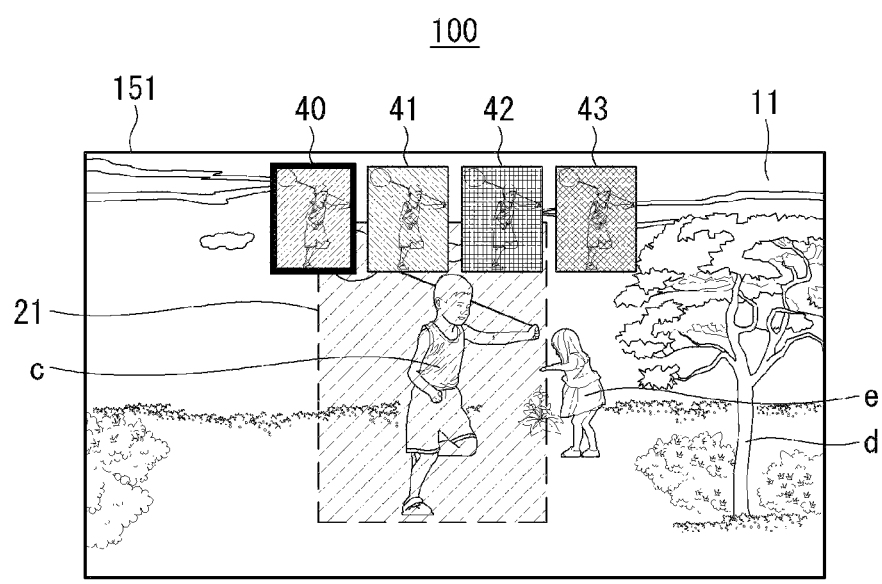

According to one embodiment, in case the first preview image 11 is changed according to the movement of the object c, the controller 180 can maintain the selected area 21. With reference to FIG. 11, since only the object c moves to the right, it can be known that the object c within the first preview image 11 has moved to the right. In this case, the controller 180 can maintain the selected area 21 as shown in FIG. 11.

To this end, the controller can track the object c belonging to the selected area 20. As described above, the first preview image 11 is the image obtained from the image sensor of the camera 121, being displayed on the touch screen 151 in frame units. The moment one area 21 is selected from the first preview image 11, the controller 180 can continuously obtain the objects corresponding to the object c belonging to the selected area 21 from subsequent preview images.

To this end, according to one embodiment, the controller 180 can also obtain the object 21 from the subsequent preview images by comparing two consecutive preview images. Various methods can be applied for extracting a moving object within images by comparing two images, not being limited to a specific method.

Accordingly, even in case the first preview image 11 is changed according to the movement of the object c, the controller 180 still can extract an area corresponding to the selected area 21 from consecutive preview images. The controller 180 can display the extracted area as the selected area 21 in the first preview image 11 displayed on the touch screen 151.

According to the description above, since a selected area is maintained continuously even when the selected area moves on the touch screen 151, the user can change image attributes of the selected area conveniently even when a mobile terminal or an object moves.

Figure 12:
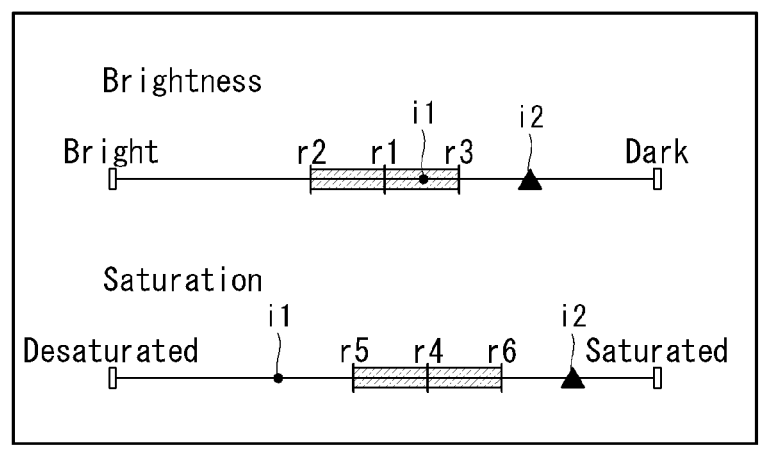
FIG. 12 illustrates determining an image attribute of a recommended image of which the image attribute is different from that of a selected area according to one embodiment of the present invention.
Figure 13:
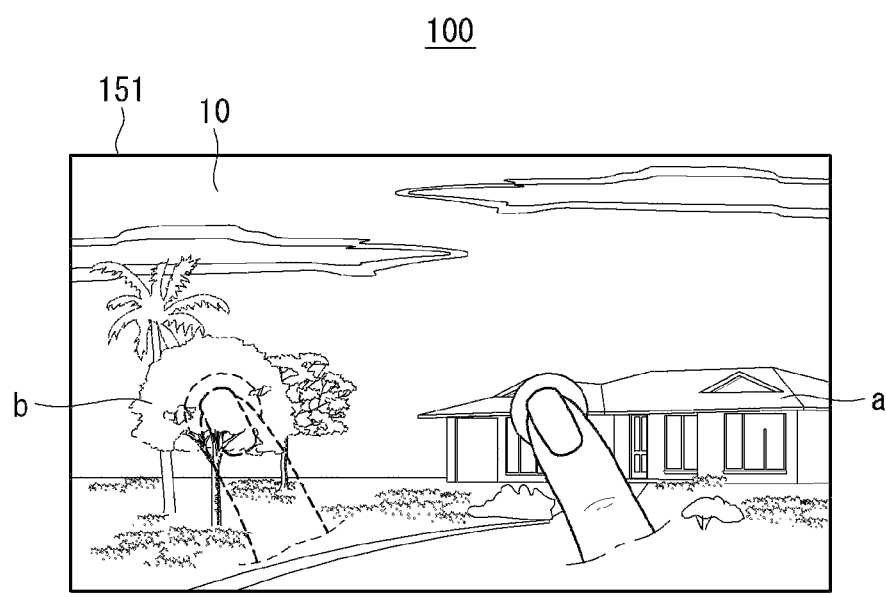
FIGS. 13 to 18 illustrate changing an image attribute by selecting a plurality of areas from a preview image according to one embodiment of the present invention.

FIG. 12 illustrates determining an image attribute of a recommended image of which the image attribute is different from that of a selected area according to one embodiment of the present invention.

According to one embodiment, the image attribute can include brightness, saturation, color, hue, contrast or sharpness of an image. However, the present invention is not limited to the aforementioned image attribute, and the image attribute can include various effects (for example, inversion of color, saturation, and brightness; horizontal or vertical image flipping; and adjusting transparency) due to image filters that can be applied to an image.

The controller 180 can extract the values of image attributes of the selected area 20. According to one embodiment, type of extracted image attribute can be predetermined. The controller 180 can generate at least one recommended image with respect to the selected area 20 on the basis of the extracted image attribute value.

According to one embodiment, a criterion for generating the recommended image can be stored in the memory 170. The memory 170 can store predetermined, separate reference ranges for a plurality of image attributes. In other words, a reference range for each image attribute, such as image brightness and saturation described above can be stored.

The reference range can be configured from a plurality of images stored in the memory 170. According to one embodiment, the plurality of images can be captured through the camera 121. Or according to another embodiment, the plurality of images can be received from the outside through the wireless communication unit 110.

The controller 180 can configure the reference range on the basis of the value of each image attribute extracted from the plurality of images. According to one embodiment, the controller 180 can extract the value of each image attribute from the plurality of images and calculated an average value. The reference range can be configured by using an interval ranging predetermined limits with respect to the calculated average value.

With reference to FIG. 12, brightness and saturation are displayed as examples of image attributes. In the case of brightness, a progress bar indicating a degree of brightness and darkness is shown. As the bar moves to the left, image brightness becomes higher. A predetermined range (from r2 to r3) based on the average brightness value r1 calculated from the plurality of images can correspond to the reference range. In the same way, a progress bar is shown indicating a degree of transparency for the case of saturation. In this case, too, a predetermined range (from r5 to r6) based on the average saturation value r4 calculated from the plurality of images can correspond to the reference range.

However, this is only an example, and the present invention is not limited to the example. A reference range can be configured without restriction and actually in the same way as long as the corresponding image attribute can be specified from an image. Also, in the case of FIG. 12, a reference range is configured for each image attribute, but the present invention is not limited to the particular case. According to one embodiment, the reference range can be configured from a relationship developed from a combination of a plurality of image attributes.

According to one embodiment, the user can configure the criterion by which the predetermined range is set. However, the present invention is not limited to the aforementioned case, and the predetermined range can be determined as the range which includes a plurality of images stored in the memory 170 by more than a particular ratio. For example, the range which includes brightness values of 80% of images among the plurality of images can be set as the predetermined range (from r2 to r3). However, this is only an example, the present invention is not limited to the example, and the predetermined range can be configured differently depending on the needs.

According to one embodiment, the controller 180 can compare the value extracted with respect to each image attribute from the selected area 20 with the reference range. The controller 180 display the image of which the selected image 20 has been compensated with respect to the image attribute exceeding the reference range as the recommended image.

With reference to FIG. 12, it is assumed that brightness and saturation extracted from the selected area 20 are i1 respectively. In this case, the brightness falls within the reference range (from r2 to r3). It indicates that the brightness of the currently selected area 20 is relevant when compared with the plurality of images.

However, saturation does not belong to the reference range (from r5 to r6). In other words, the saturation of the currently selected area 20 is relatively high compared with the plurality of images. Therefore, the controller 180 can generate a recommended image of which the saturation value is compensated for the selected area 20. According to one embodiment, the controller 180 can generate at least one recommended image having saturation values within the reference range (from r5 to r6).

According to another embodiment, FIG. 12 assumes that the brightness and saturation extracted from the selected area 20 are i2 respectively. In this case, brightness does not fall within the reference range (from r2 to r3). Also, saturation doesn't belong to the reference range (from r5 to r6).

In other words, the brightness and saturation of the currently selected area 20 are relatively low compared with the plurality of images. Therefore, the controller 180 can generate a recommended image of which the brightness and saturation have been compensated for the selected area 20.

According to one embodiment, the controller 180 can generate at least one recommended image having the brightness value within the reference range (from r2 to r3). Also, the controller 180 can generate at least one recommended image having the saturation value within the reference range (from r5 to r6).

According to one embodiment, at least one recommended image generated can be indicated being classified according to each image attribute. In other words, in the example above, the controller 180 can display at least one recommended image with respect to brightness and at least one recommended image with respect to saturation separately on the touch screen 151 when the one area 20 is selected. In this case, the controller 180 can display the information representing each image attribute on each recommended image.

According to one embodiment, the controller 180 can generate and display recommended images having the brightness value within the reference range (from r2 to r3) and having the saturation value within the reference range (from r5 to r6). For either case, if a plurality of recommended images are displayed on the touch screen 151, each recommended image can be configured to have a different value from each other with respect to at least one image attribute.

In the description above, only brightness and saturation values have been dealt with among image attributes of a selected area; however, the description above can be applied virtually in the same way for other image attributes.

According to the description above, since a recommended image is provided with respect to an image attribute among image attributes of a selected area which departs from a reference range, the user can change the selected area to have a more relevant image attribute. Also, since the reference range of each image attribute is calculated from a pre-obtained image, the user can get a recommended image according to image attributes that the user commonly employs for image capture. Also, since the reference range of each image attribute is calculated from a plurality of images received from the outside, the user can capture an image with image attributes similar to those of the image received from the outside. Also, since a plurality of recommended images are provided with various image attribute values, the user can check various display forms with respect to a selected area.

FIGS. 13 to 18 illustrate changing an image attribute by selecting a plurality of areas from a preview image according to one embodiment of the present invention.

Figure 14:
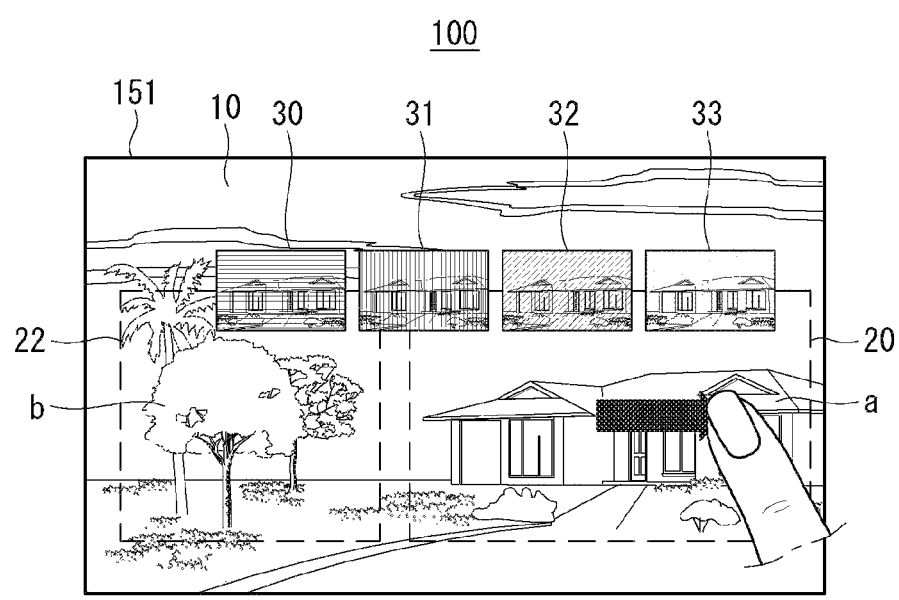

In case a plurality of areas are selected from a first preview image 10, the controller 180 can extract image attribute values of the selected recommended image and apply the extracted image attribute values to the plurality of areas. Suppose the user attempts to change the image attribute with respect to two objects a, b within the first preview image 10 show in FIG. 13. In this case, as shown in FIG. 14, the user can touch the object b and drag the object b to the right while keeping touching the object a.

The controller 180 can select the areas 20, 22 which include the objects a, b respectively and display the selected areas to be distinguished from each other. The controller 180 can extract the value of each image attribute from the finally dragged area 20. The controller 180 can generate a recommended image on the basis of the extracted image attribute value. Afterwards, the controller 180 can display the generated recommended images 30, 31, 32, 33 on the touch screen 151 as shown in FIG. 14.

Figure 15:
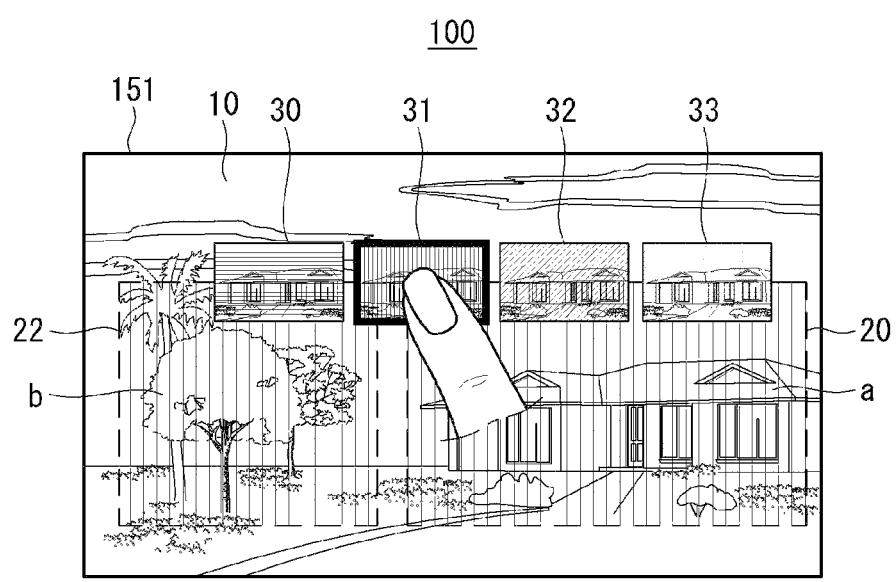
Figure 16:
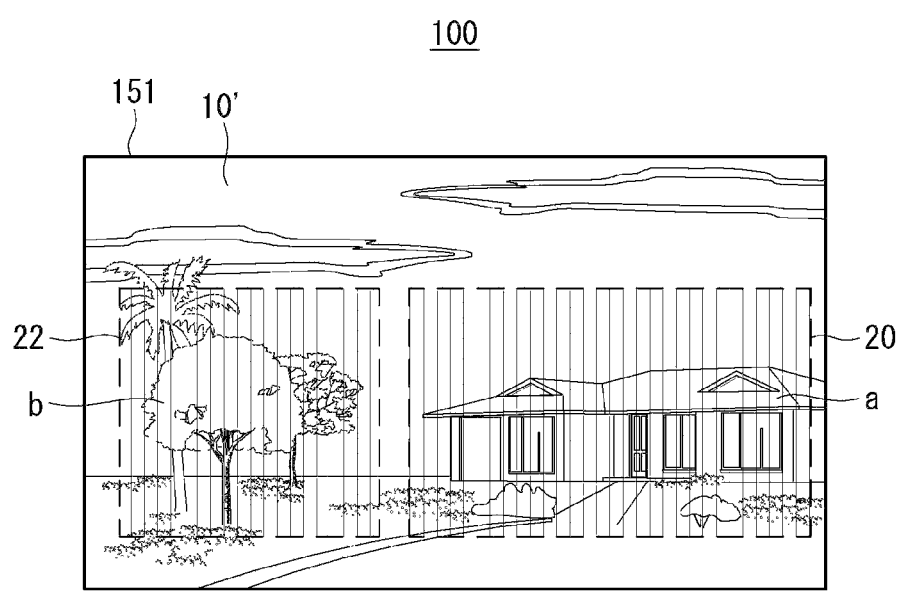

With reference to FIG. 15, the user can select a recommended image 31 displayed according to the image attribute that the user wants to apply. If the recommended image 31 is selected, the controller 180 can change the image attribute of the selected area 20, 22 to the image attribute of the recommended image 31. Afterwards, if change of the image attribute of the selected area 20, 22 is completed, a second preview image 10' of which the selected area 20, 22 has been changed can be displayed on the touch screen 151 as shown in FIG. 16. Afterwards, the second preview image 10' can be captured.

According to another embodiment, image attributes of the selected areas 20, 22 can be changed separately. The selected areas 20, 22 can be selected by a touch input different from the touch input described with reference to FIGS. 13 and 14. For example, after touching the object b, the user can select the two areas 20, 22 by applying a long touch input maintained for more than a predetermined time period while keeping touching the object a.

However, the description above is only an example, and the present invention is not limited thereto. The different touch input can be implemented by various touch methods such as a short touch, long touch, multi-touch, drag touch, flick touch, pinch-in touch, pinch-out touch, swipe touch, and hovering touch; and a combination thereof.

Figure 17:
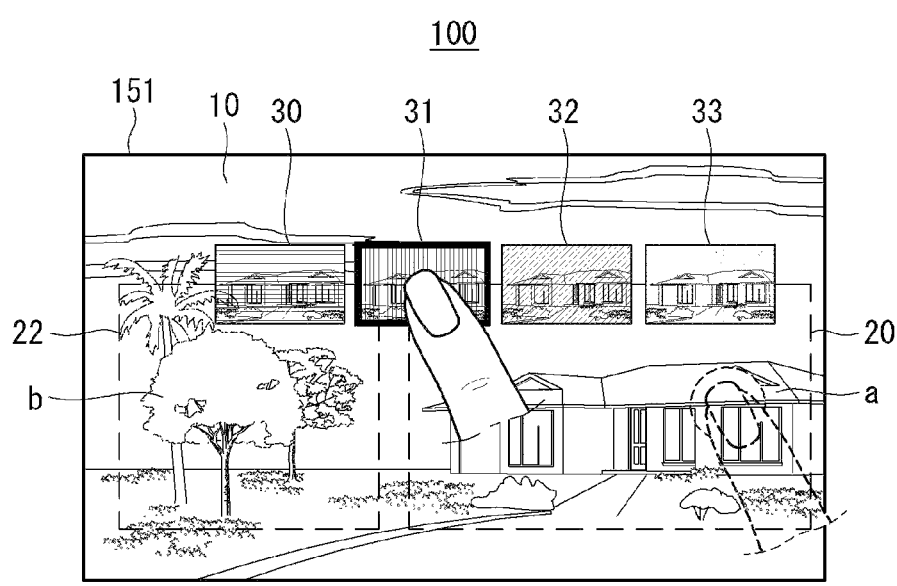
Figure 18:
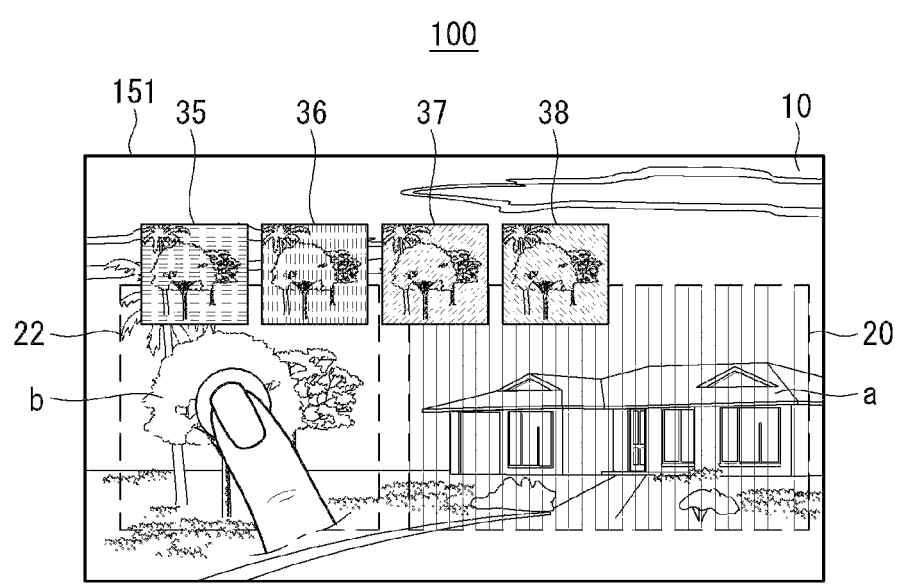

FIG. 17 illustrates a case where while two areas 20, 22 are selected according to the different touch input, recommended images 30, 31, 32, 33 with respect to the selected area 20 in the right side is displayed. After selecting the recommended image 31, the user can touch the selected area 22 in the left side as shown in FIG. 18.

In this case, the controller 180 can display recommended images 35, 36, 37, 38 with respect to the selected area 22 on the touch screen 151. Since the image attributes of the two selected areas 20, 22 can be different from each other, the image attributes of the displayed recommended images 35, 36, 37, 38 may not be the same as the image attributes of the recommended images 30, 31, 32, 33 shown in FIG. 18.

Afterwards, the user can select a recommended image that the user wants among the displayed recommended images 35, 36, 37, 38. Accordingly, the two selected areas 20, 22 can be displayed with different image attributes being applied thereto respectively.

According to the description above, a plurality of areas can be selected, and the image attribute of each area can be changed according to a simple touch input.

Figure 19:
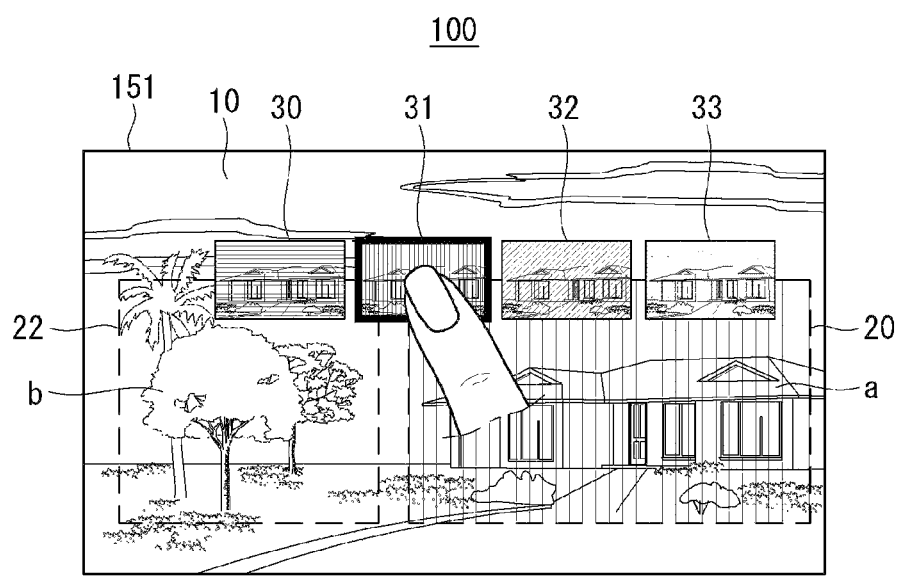
FIGS. 19 to 21 illustrate applying an image attribute applied to one area to another area according to one embodiment of the present invention.
Figure 20:
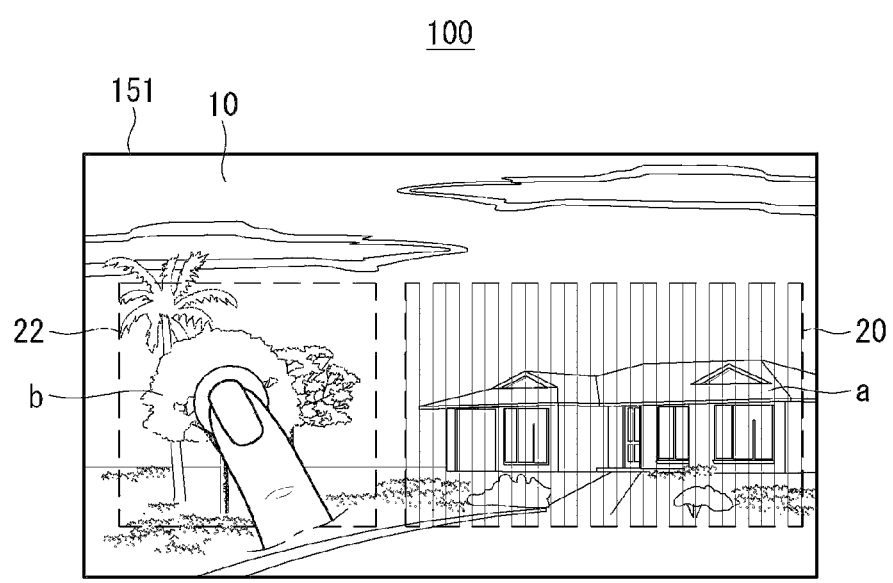
Figure 21:
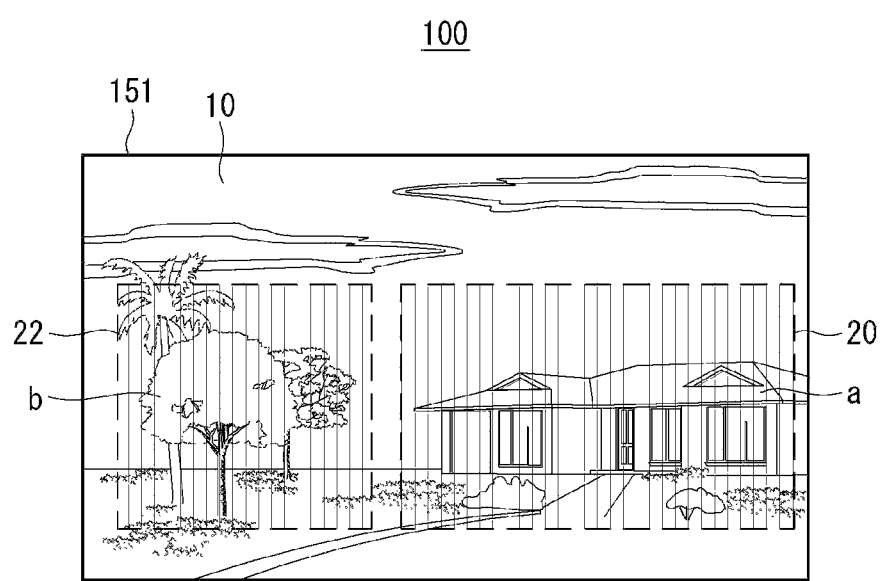

FIGS. 19 to 21 illustrate applying an image attribute applied to one area to another area according to one embodiment of the present invention.

FIG. 19 shows a case that an image attribute of a selected recommended image 31 from a first preview image 10 is applied to a selected area 20. Before a predetermined time period is passed after the selected recommended image 31 is reflected in the selected area 20, the controller 180 can receive an input selecting a different area as shown in FIG. 20. The predetermined time period is not limited to a specific period and can be configured differently depending on the needs.

In this case, the controller 180 can extract the image attribute value of the selected recommended image 31 and apply the extracted image attribute value to the different area 22. Accordingly, as shown in FIG. 21, the different area 22 can also be displayed with the same image attribute as that applied to the selected area 20.

In the description above, only one different area 22 has been dealt with, but the present invention is not limited to the specific description. If a plurality of areas are selected within the predetermined time period respectively after the selected recommended image 31 is reflected in the selected area 20, the plurality of selected areas can also be changed according to the image attribute value of the recommended image 31.

According to the description above, the user can select a plurality of areas according to a simple touch input and change the image attribute of each area easily.

Figure 22:
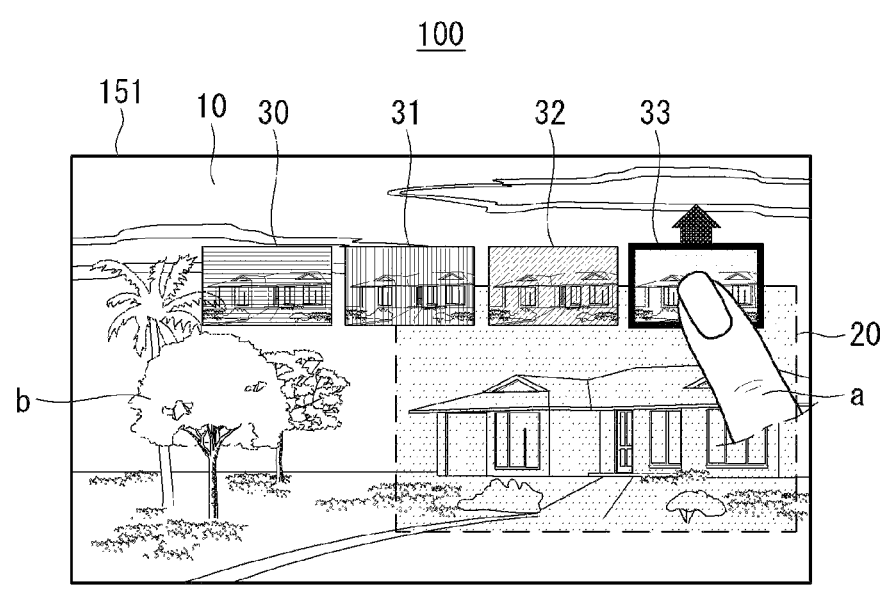
FIGS. 22 and 23 illustrate reflecting image attributes of a plurality of recommended images to a selected area according to one embodiment of the present invention.
Figure 23:
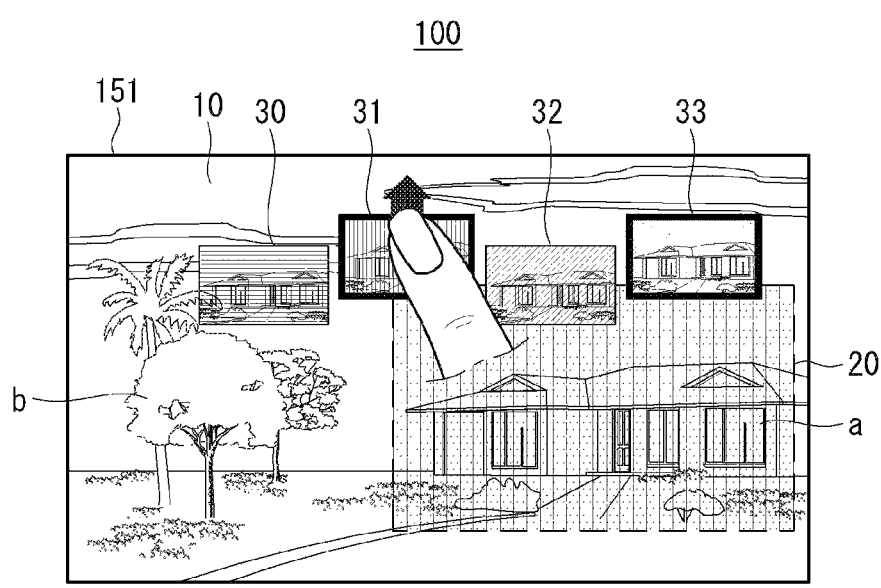

FIGS. 22 and 23 illustrates reflecting image attributes of a plurality of recommended images in a selected area according to one embodiment of the present invention.

The controller 180 can receive a touch input selecting a plurality of recommended images from among the displayed recommended images. With reference to FIG. 22, the user can drag a recommended image 33 to reflect among recommended images 30, 31, 32, 33 displayed on the touch screen 151 in an upward direction. The controller 180 can change a selected area 20 by reflecting the image attribute of the recommended image 33 therein. The controller 180 can display the recommended image 33 above the other recommended images 30, 31, 32.

With reference to FIG. 23, the user can drag the recommended image 30 to be reflected in the selected area 20 in an upward direction. The controller 180 can also reflect the image attribute of a newly selected recommended image 31 in the selected area 20. In the same way, the controller 180 can display the recommended image 31 above the other recommended images 30, 32.

The controller 180 can extract the image attribute values of the plurality of selected recommended images 31, 33 and apply the extracted image attributes into the selected area respectively. According to one embodiment, in case the image attribute of the recommended image 33 is different from that of the recommended image 31, each image attribute can be reflected separately in the selected area 20.

According to another embodiment, in case the recommended image 33 has the same image attribute as that of the recommended image 31, an average value of the same image attributes can be reflected in the selected area 20. However, this is only one example, and a method for reflecting image attributes of a plurality of recommended images can be applied differently depending on the needs.

According to the description above, since a plurality of recommended images are selected, and image attributes of the individual recommended images are reflected, the user can express the selected area with more various image attributes.

FIGS. 24 to 27 illustrate changing an image attribute of a recommended image and applying the changed image attribute to a selected area according to one embodiment of the present invention.

Figure 24:
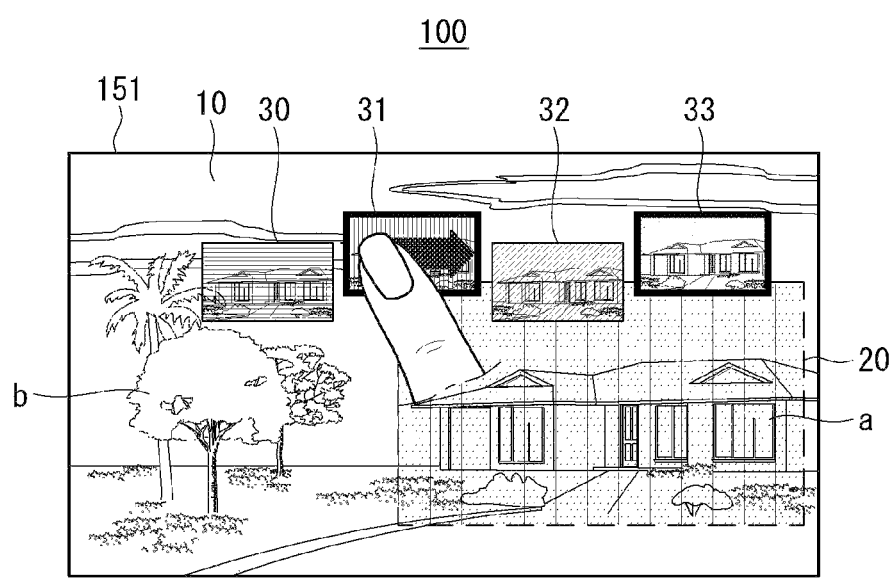
FIGS. 24 to 27 illustrate changing an image attribute of a recommended image and applying the changed image attribute to a selected area according to one embodiment of the present invention.

With reference to FIG. 24, a first preview image 10 displays a selected area 20 and recommended images 30, 31, 32, 33 with respect to the selected area 20. As described with reference to FIGS. 22 and 23, it is assumed that two recommended images 31, 33 are selected and displayed above the other recommended images.

Figure 25:
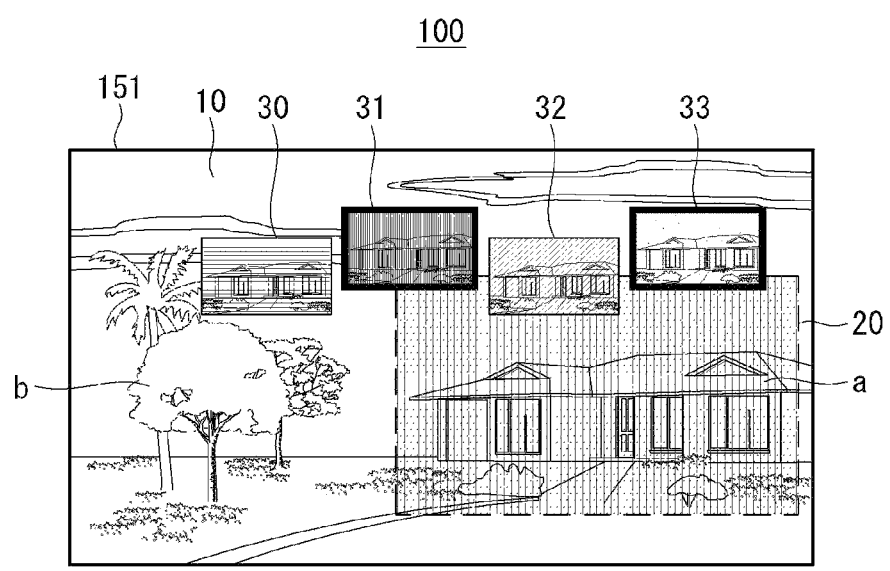

The controller 180 can change the image attribute of the selected recommended image 31 according to a dragging input with respect to an area in which the selected recommended image 31 is displayed. As shown in FIG. 24, the user can apply a dragging input to the right with respect to the area in which the selected recommended image 31. In this case, as shown in FIG. 25, the image attribute of the selected recommended image 31 can be more intensified.

For example, in case the image attribute is brightness, the brightness value of the selected recommended image 31 can be increased according to the dragging input to the right. In this regard, for the convenience of drawing a figure, FIG. 25 illustrates a case that vertical lines displayed on the recommended image 31 are being spaced more compactly.

In case the image attribute of the selected recommended image 31 is changed, the controller 180 can also change the image attribute of the selected area 20 in the same way as the image attribute of the selected recommended image 31. The vertical lines of the selected area of FIG. 25 are spaced more compactly than FIG. 24. This indicates that the image attribute has been intensified.

Figure 26:
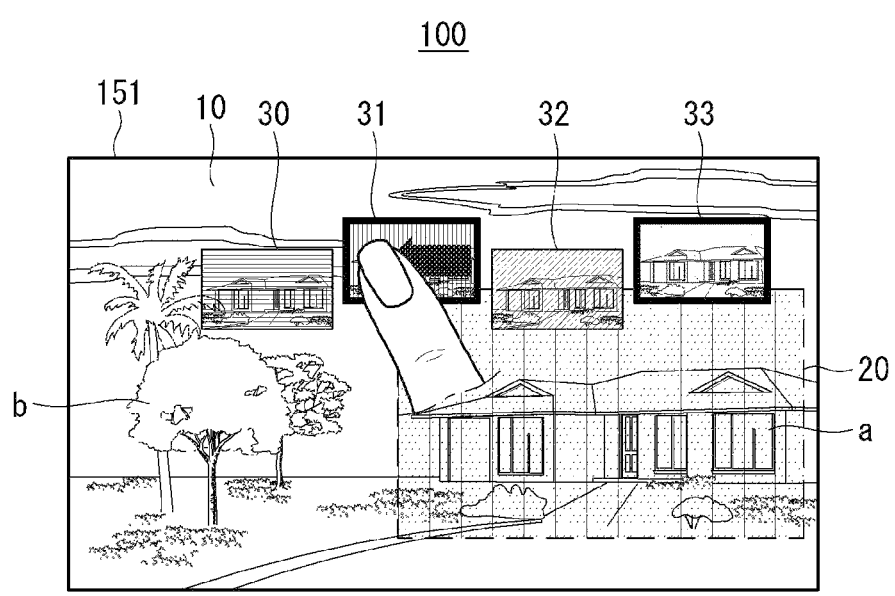
Figure 27:
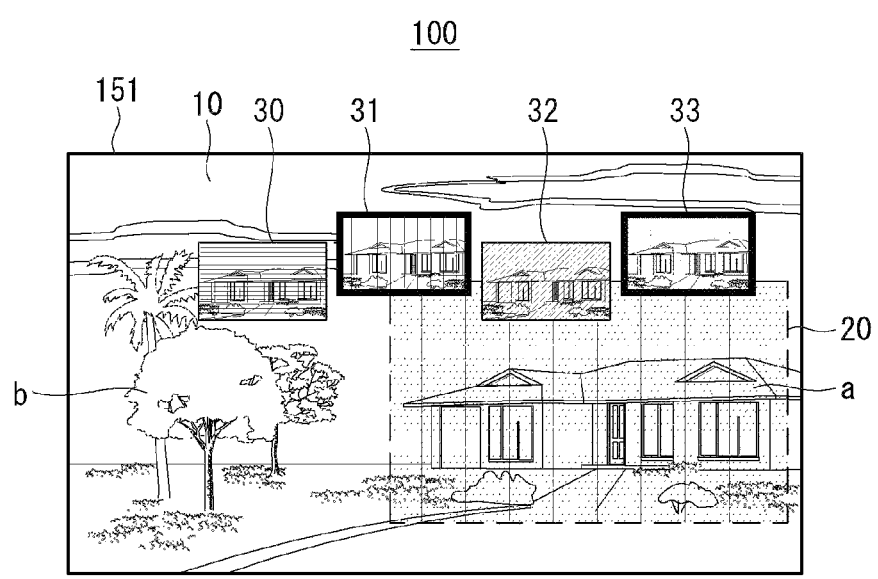

On the contrary, as shown in FIG. 26, the user can apply a dragging input to the left with respect to the area in which the selected recommended image 31. In this case, as shown in FIG. 27, degree of the image attribute of the selected recommended image 31 can be lowered further.

For example, in case the image attribute is brightness, the brightness value of the selected recommended image 31 can be decreased according to the dragging input to the left. In this regard, for the convenience of drawing a figure, FIG. 27 illustrates a case that vertical lines displayed on the recommended image 31 are being spaced more sparsely.

In case the image attribute of the selected recommended image 31 is changed, the controller 180 can also change the image attribute of the selected area 20 in the same way as the image attribute of the selected recommended image 31. The vertical lines of the selected area of FIG. 27 are spaced more sparsely than FIG. 26. This indicates that degree of the image attribute has been lowered.

According to the description above, since an image attribute to be applied is changed according to a simple touch input in a recommended image, the user can easily change the image attribute to be applied to the selected area.

Figure 28:
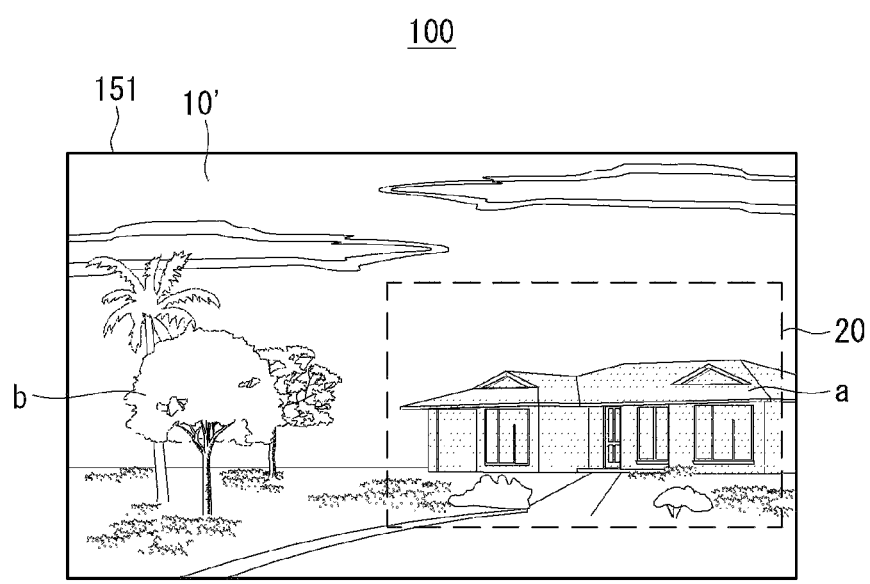
FIGS. 28 to 30 illustrate applying a changed image attribute to the background of a selected area according to one embodiment of the present invention.
Figure 29:
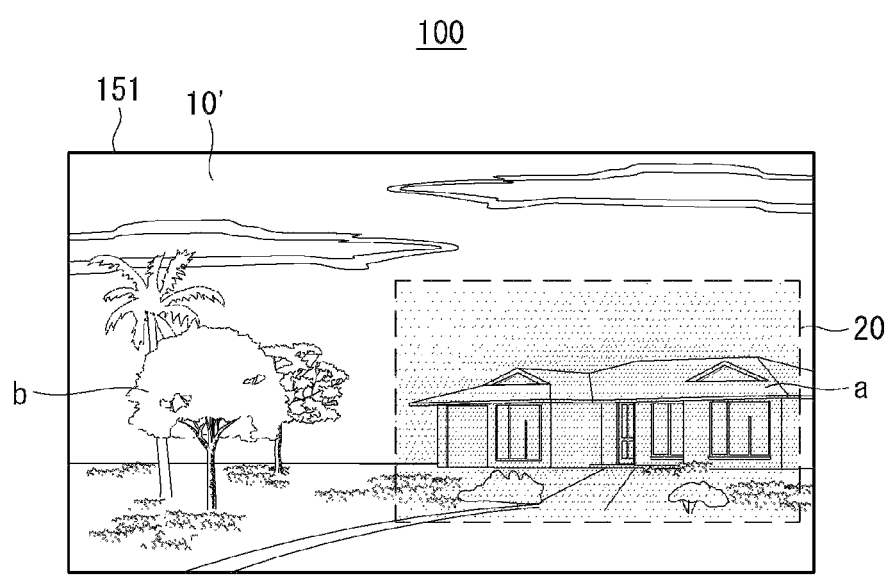
Figure 30:
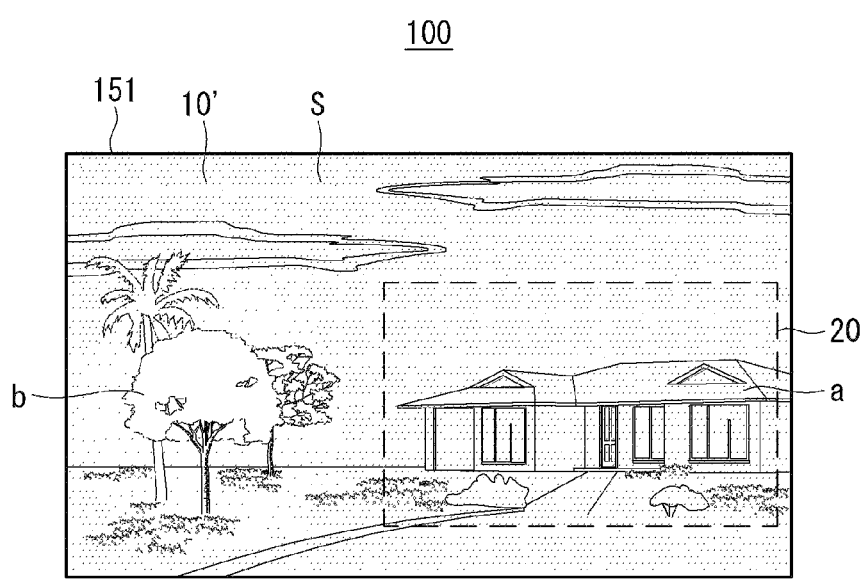

FIGS. 28 to 30 illustrate applying a changed image attribute to the background of a selected area according to one embodiment of the present invention.

In what follows, it is assumed that a second preview image 10' where the image attribute of the aforementioned recommended image 33 has been applied to the selected area 20 is displayed on the touch screen 151. The controller 180 can distinguish the selected area 20 from an object a. Since extraction of an object in an image can be performed by using a method well-known to the related field, detailed descriptions thereof will be omitted.

With reference to FIG. 28, according to one embodiment, the controller 180 can reflect the selected recommended image 33 only in the area in which the object a extracted from the selected area 20 is displayed. Accordingly, since the image attribute of the background within the selected area 20 is retained without being modified, the background within the selected area 20 can be displayed in harmony with the background outside the selected area 20.

With reference to FIG. 29, according to one embodiment, the controller 180 can reflect the selected recommended image 33 with respect to the object a and the background. In this case, the controller 180 can change the image attribute value of the background gradually from the central part of the selected area 20 toward the boundary thereof so that the background of the selected area 20 may not stand out from the other areas of the second preview image 10'.

In other words, for the part adjacent to the object a within the background of the selected area 20, the controller 180 can apply the image attribute in the same degree as the object a. Also, the controller 180 can change the image attribute of the background of the selected area 20 gradually so that the background of the selected area 20 becomes the same as the background of the outside area as the boundary (where the background of the selected area 20 meets the background of the outside area) of the selected area 20 is approached from the part neighboring the object a.

For example, if the brightness value among the image attributes of the initial first preview image 10 is 1, a relative value of the brightness value applied to the object a is assumed to be 5. In this case, the brightness value of the area adjacent to the object a within the background of the selected area 20 can be made slightly smaller than 5. Afterwards, being inversely proportional the distance to the boundary of the selected area 20, the brightness value of the selected area 20 can be reduced gradually down to 1.

According to the description above, a problem that a modified image attribute is applied only to the object a, and only the object a stands out can be alleviated.

With reference to FIG. 30, according to one embodiment, the controller 180 can apply the image attribute value of the background to the background s of the second preview image so that the background of the selected area 20 does not stand out from the other areas of the second preview image 10'.

In this case, according to one embodiment, the controller 180 can display the background s to maintain its original image attribute in the area close to the boundary where the background s of the second preview image meets the other object b. For example, suppose brightness value among the image attribute of the original first preview image 10 is 1, and a relative value of the brightness applied to the background s is 5. In this case, the brightness value in the area of the background of the selected area 20 separated by a predetermined distance from the object b can be made slightly smaller than 5. Afterwards, being inversely proportional the distance to the boundary of the object b, the brightness value of the background s can be reduced gradually down to 1.

According to the description above, by applying a changed image attribute to the background of a selected area appropriately, the user can prevent the selected area from standing out due to change of the image attribute.

Figure 31:
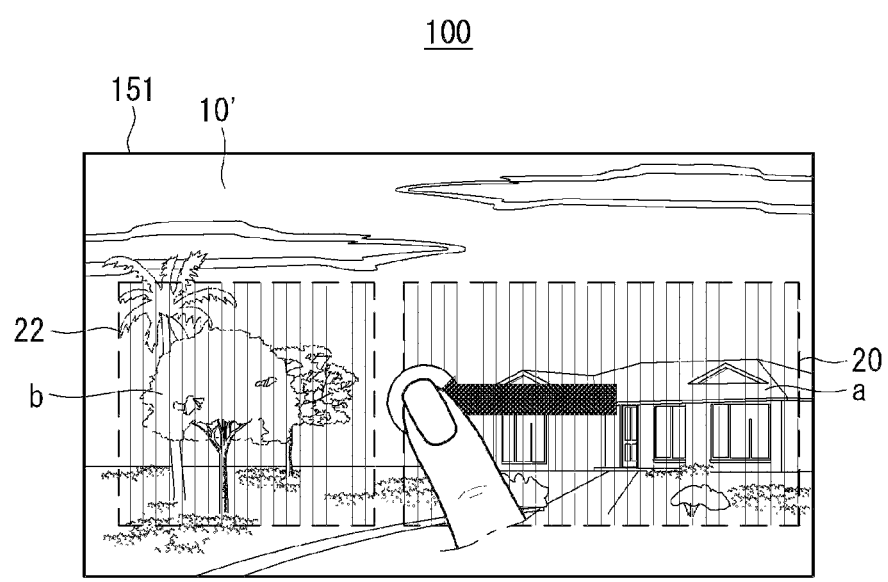
FIGS. 31 and 32 illustrate restoring a selected area of which the image attribute has been changed to its original state according to one embodiment of the present invention.
Figure 32:
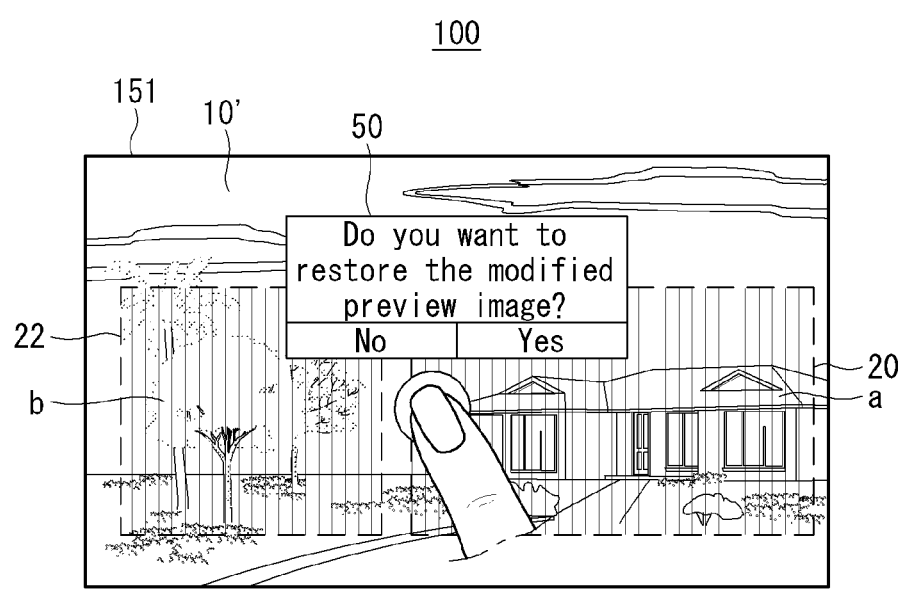

FIGS. 31 and 32 illustrate restoring a selected area of which the image attribute has been changed to its original state according to one embodiment of the present invention.

FIG. 31 shows a touch screen 151 displaying a second preview image 10' including two selected areas 20, 22 of which the image attributes have been changed. If receiving a predetermined touch input, the controller 180 can restore the second preview image 10' to the first preview image 10.

According to one embodiment, the predetermined touch input can be configured to correspond to an input selecting an area of which the image attribute is changed. In other words, as shown in FIG. 5, if one area 20 is selected according to a dragging input to the right, the predetermined touch input can be set as a dragging input to the left as shown in FIG. 31.

However, this is only one example, and the present invention is not limited to the example. The predetermined touch input can be implemented by various touch methods such as a short touch, long touch, multi-touch, drag touch, flick touch, pinch-in touch, pinch-out touch, swipe touch, and hovering touch; and a combination thereof.

As shown in FIG. 32, if the predetermined touch input is applied, the controller 180 can display a notification window 50 notifying that the second preview image 10' can be restored to the first preview image 10 of which the image attribute has not been changed. If the user selects 'yes' from the notification window 50, the controller 180 removes the changed image attribute and display the first preview image of which the image attribute has not been changed.

According to the description above, since a selected area of which the image attribute has been changed can be restored to its original state according to a simple touch input, the user can easily attempt to change the image attribute.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a camera;
a touch screen;
a memory that stores a range of reference values for each of a plurality of image attributes; and
a controller configured to:
control the touch screen to display a first preview image obtained from the camera,
receive a first touch input selecting an area of the first preview image,
extract a value for each of the plurality of image attributes from the selected area,
determine at least one image attribute having an extracted value that is not within the range of reference values among the plurality of image attributes,
generate at least one recommended image that is compensated to have value of the image attribute within the corresponding range of reference values for the determined at least one image attribute, the at least one recommended image corresponding to the selected area,
control the touch screen to display on an area of the touch screen, the at least one recommended image, the at least one recommended image having image attributes, at least one of which has a value that differs from that of the selected area, and
control the touch screen to display a second preview image, in response to receiving a second touch input selecting one of the at least one displayed recommended images, the second preview image reflecting the selected recommended image on the selected area.

2. The mobile terminal of claim 1, wherein the controller determines the selected area so that it incorporates an object displayed in the first preview image to which the first touch input is applied.

3. The mobile terminal of claim 2, wherein the first touch input is a dragging input.

4. The mobile terminal of claim 2, wherein the controller maintains the selected area when the first preview image changes due to movement of the mobile terminal.

5. The mobile terminal of claim 2, wherein the controller maintains the selected area when movement of the object within the first preview image is detected.

6. The mobile terminal of claim 1, wherein the controller further controls the touch screen to display a boundary of the selected area.

7. The mobile terminal of claim 1, wherein the image attributes include one or more of brightness, saturation, color, hue, contrast and sharpness.

8. The mobile terminal of claim 1, wherein the memory stores a plurality of images captured through the camera, and wherein the controller determines the range of reference values for each of the plurality of image attributes based on a value extracted from the plurality of images for each of the plurality of image attributes.

9. The mobile terminal of claim 1, further comprising a wireless communication unit,
wherein the controller receives a plurality of images through the wireless communication unit and determines the range of reference values for each of the plurality of image attributes based on a value extracted from the plurality of images for each of the plurality of image attributes.

10. The mobile terminal of claim 1, wherein when the controller controls the touch screen to display more than one recommended image, each of the recommended images has a different value with respect to at least one image attribute compared to each of the other one or more recommended images.

11. The mobile terminal of claim 1, wherein when a plurality of areas are selected in the first preview image, the controller extracts an image attribute value of the selected recommended image and applies the extracted image attribute value to each of the plurality of selected areas.

12. The mobile terminal of claim 1, wherein when a second area is selected in the first preview image before a predetermined time period elapses after displaying the second preview image wherein the selected recommended image is reflected in the selected area, the controller extracts an image attribute value of the selected recommended image and applies the extracted image attribute value to the second selected area.

13. The mobile terminal of claim 1, wherein when a plurality of recommended images are displayed and more than one recommended image is selected, the controller extracts an image attribute value from each of the selected recommended images and applies the extracted image attribute values to the selected area.

14. The mobile terminal of claim 1, wherein the controller changes image attributes of the selected recommended image in response to a dragging input on an area of the touch screen displaying the selected recommended image.

15. The mobile terminal of claim 1, wherein the controller separates the selected area into an object and a background and reflects the selected recommended image for the object.

16. The mobile terminal of claim 15, wherein the controller changes image attribute values of the background incrementally from a central area of the selected area to the boundary thereof until the background of the selected area is not distinguishable from other areas of the second preview image.

17. The mobile terminal of claim 15, wherein the controller applies image attribute values of the background in the selected area to the background of the remaining portion of the second preview image until the background of the selected area is not distinguishable from other areas of the second preview image.

18. The mobile terminal of claim 1, wherein the controller restores the second preview image to the first preview image in response to a third touch input.

19. A method for controlling a mobile terminal, the method comprising:
   storing a range of reference values for each of a plurality of image attributes in a memory;
   displaying on a touch screen a first preview image obtained from a camera;
   receiving a first touch input selecting an area of the first preview image;
   extracting a value for each of the plurality of image attributes from the selected area;
   determining at least one image attribute having an extracted value that is not within the range of reference values among the plurality of image attributes;
   generating at least one recommended image that is compensated to have value of the image attribute within the corresponding range of reference values for the determined at least one image attribute, the at least one recommended image corresponding to the selected area;
   displaying on an area of the touch screen, the at least one recommended image, the at least one recommended image having image attributes, at least one of which has a value that differs from that of the selected area;
   receiving a second touch input selecting one of the at least one displayed recommended images; and
   displaying on the touch screen a second preview image reflecting the selected recommended image on the selected area.

* * * * *